(12) United States Patent
Wang et al.

(10) Patent No.: US 10,023,713 B2
(45) Date of Patent: Jul. 17, 2018

(54) HOLLOW NANO-PARTICLES AND METHOD THEREOF

(71) Applicant: Bridgestone Corporation, Tokyo (JP)

(72) Inventors: Xiaorong Wang, Hudson, OH (US); Mindaugas Rackaitis, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 5 days.

(21) Appl. No.: 14/531,445

(22) Filed: Nov. 3, 2014

(65) Prior Publication Data
US 2015/0045463 A1 Feb. 12, 2015

Related U.S. Application Data

(62) Division of application No. 11/642,796, filed on Dec. 20, 2006, now Pat. No. 8,877,250.

(60) Provisional application No. 60/751,830, filed on Dec. 20, 2005.

(51) Int. Cl.
| | | |
|---|---|---|
| *C08J 9/28* | (2006.01) | |
| *B01J 13/14* | (2006.01) | |
| *B82Y 30/00* | (2011.01) | |
| *C08F 257/02* | (2006.01) | |

(52) U.S. Cl.
CPC ............. *C08J 9/286* (2013.01); *B01J 13/14* (2013.01); *B82Y 30/00* (2013.01); *C08F 257/02* (2013.01); *C08J 2201/0502* (2013.01); *C08J 2353/02* (2013.01); *Y10S 977/773* (2013.01); *Y10T 428/249972* (2015.04); *Y10T 428/2985* (2015.01)

(58) Field of Classification Search
CPC ........ B01J 13/14; B82Y 30/00; C08F 257/02; C08J 9/286; C08J 2201/0502; C08J 2353/02; Y10S 977/773; Y10T 428/249972; Y10T 428/2985
See application file for complete search history.

(56) References Cited

U.S. PATENT DOCUMENTS

| | | |
|---|---|---|
| 2,531,396 A | 11/1950 | Carter et al. |
| 3,177,186 A | 4/1965 | Miller |
| 3,598,884 A | 8/1971 | Wei et al. |
| 3,793,402 A | 2/1974 | Owens |
| 3,840,620 A | 10/1974 | Gallagher |
| 3,927,143 A | 12/1975 | Makowski et al. |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lai et al. |
| 4,326,008 A | 4/1982 | Rembaum |
| 4,386,125 A | 5/1983 | Shiraki et al. |
| 4,408,018 A | 10/1983 | Bartman et al. |
| 4,417,029 A | 11/1983 | Milkovich |
| 4,471,093 A | 9/1984 | Furukawa et al. |
| 4,543,403 A | 9/1985 | Isayama et al. |
| 4,600,749 A | 7/1986 | Minekawa et al. |
| 4,617,346 A | 10/1986 | Sonoda |
| 4,659,782 A | 4/1987 | Spinelli |
| 4,659,790 A | 4/1987 | Shimozato et al. |
| 4,717,655 A | 1/1988 | Fluwyler |
| 4,722,770 A | 2/1988 | Blottiere et al. |
| 4,725,522 A | 2/1988 | Breton et al. |
| 4,764,572 A | 8/1988 | Bean, Jr. |
| 4,774,189 A | 9/1988 | Schwartz |
| 4,798,691 A | 1/1989 | Kasai et al. |
| 4,818,785 A | 4/1989 | Otawa et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |
| 5,130,377 A | 7/1992 | Trepka et al. |
| 5,169,914 A | 12/1992 | Kaszas et al. |
| 5,183,851 A | 2/1993 | Visani et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,256,736 A | 10/1993 | Trepka et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,298,559 A | 3/1994 | Fuji et al. |
| 5,329,005 A | 7/1994 | Lawson et al. |
| 5,331,035 A | 7/1994 | Hall |
| 5,336,712 A | 8/1994 | Austgen, Jr. et al. |

(Continued)

FOREIGN PATENT DOCUMENTS

| | | |
|---|---|---|
| CA | 2127919 | 3/1995 |
| CN | 1560094 | 1/2005 |

(Continued)

OTHER PUBLICATIONS

Alexandridis, Paschalis et al., "Amphiphilic Block Copolymers: Self-Assembly and Applications", Elsevier Science B.V., pp. 1-435 (2000).

(Continued)

*Primary Examiner* — Matthew P Coughlin
*Assistant Examiner* — Thurman M Wheeler
(74) *Attorney, Agent, or Firm* — Meredith E. Hooker; Nathan T. Lewis

(57) ABSTRACT

The invention provides a hollow nano-particle comprising a crosslinked shell and a void core; and a preparation method thereof. The hollow nano-particle may be used in rubber composition, tire product, and pharmaceutical delivery system etc.

17 Claims, 5 Drawing Sheets

(56) References Cited

U.S. PATENT DOCUMENTS

| | | |
|---|---|---|
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,534,592 A | 7/1996 | Halasa et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,674,592 A | 10/1997 | Clark et al. |
| 5,686,528 A | 11/1997 | Wills et al. |
| 5,688,856 A | 11/1997 | Austgen, Jr. et al. |
| 5,700,897 A | 12/1997 | Klainer et al. |
| 5,728,791 A | 3/1998 | Tamai et al. |
| 5,733,975 A | 3/1998 | Aoyama et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,834,563 A | 11/1998 | Kimura et al. |
| 5,847,054 A | 12/1998 | McKee et al. |
| 5,849,847 A | 12/1998 | Quirk |
| 5,891,947 A | 4/1999 | Hall et al. |
| 5,897,811 A | 4/1999 | Lesko |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,046,275 A | 4/2000 | Nakano et al. |
| 6,075,092 A | 6/2000 | Nakamura et al. |
| 6,087,016 A | 7/2000 | Feeney et al. |
| 6,117,932 A | 9/2000 | Hasegawa et al. |
| 6,127,488 A | 10/2000 | Obrecht et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,204,320 B1 | 3/2001 | Blok et al. |
| 6,204,354 B1 | 3/2001 | Wang et al. |
| 6,207,263 B1 | 3/2001 | Takematsu et al. |
| 6,252,014 B1 | 6/2001 | Knauss |
| 6,268,451 B1 | 7/2001 | Faust et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,492,466 B2 | 12/2002 | Willis et al. |
| 6,506,567 B2 | 1/2003 | Makino et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,823 B2 | 3/2004 | Wang et al. |
| 6,727,307 B2 | 4/2004 | Kondo et al. |
| 6,737,486 B2 | 5/2004 | Wang |
| 6,774,185 B2 | 8/2004 | Lin et al. |
| 6,777,500 B2 | 8/2004 | Lean et al. |
| 6,780,937 B2 | 8/2004 | Castner |
| 6,872,785 B2 | 3/2005 | Wang et al. |
| 6,875,818 B2 | 4/2005 | Wang |
| 6,956,084 B2 | 10/2005 | Wang et al. |
| 7,056,840 B2 | 6/2006 | Miller et al. |
| 7,067,199 B2 | 6/2006 | Hattori et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng |
| 7,538,159 B2 | 5/2009 | Wang et al. |
| 7,544,740 B2 | 6/2009 | Wang et al. |
| 7,553,909 B2 | 6/2009 | Wang et al. |
| 7,560,510 B2 | 7/2009 | Wang et al. |
| 7,597,959 B2 | 10/2009 | Wang et al. |
| 7,649,049 B2 | 1/2010 | Kleckner et al. |
| 7,659,342 B2 | 2/2010 | Wang et al. |
| 7,695,813 B2 | 4/2010 | Schultes et al. |
| 7,718,737 B2 | 5/2010 | Wang et al. |
| 7,718,738 B2 | 5/2010 | Bohm et al. |
| 7,786,236 B2 | 8/2010 | Wang et al. |
| 7,795,344 B2 | 9/2010 | Wang et al. |
| 7,820,771 B2 | 10/2010 | Lapra et al. |
| 7,829,624 B2 | 11/2010 | Warren |
| 7,884,160 B2 | 2/2011 | Wang et al. |
| 7,897,690 B2 | 3/2011 | Wang et al. |
| 7,998,554 B2 | 8/2011 | Wang et al. |
| 8,063,142 B2 | 11/2011 | Wang et al. |
| 8,288,473 B2 | 10/2012 | Wang et al. |
| 8,349,964 B2 | 1/2013 | Wang et al. |
| 8,410,225 B2 | 4/2013 | Wang et al. |
| 8,541,503 B2 | 9/2013 | Wang et al. |
| 8,697,775 B2 | 4/2014 | Hall et al. |
| 8,846,819 B2 | 9/2014 | Chen et al. |
| 8,877,250 B2 | 11/2014 | Wang et al. |
| 8,957,154 B2 | 2/2015 | Wang et al. |
| 9,061,900 B2 | 6/2015 | Scurati et al. |
| 9,062,144 B2 | 6/2015 | Wang et al. |
| 9,115,222 B2 | 8/2015 | Kitano et al. |
| 9,631,056 B2 | 4/2017 | Chen et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2003/0124353 A1 | 7/2003 | Wang et al. |
| 2003/0149185 A1 | 8/2003 | Wang et al. |
| 2003/0171522 A1 | 9/2003 | Brandenburg |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0065425 A1 | 4/2004 | Irwin et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2004/0202881 A1 | 10/2004 | Everaerts et al. |
| 2005/0006014 A1 | 1/2005 | Halasa et al. |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0220750 A1 | 10/2005 | Robert et al. |
| 2005/0220890 A1 | 10/2005 | Charmot et al. |
| 2005/0228074 A1 | 10/2005 | Wang et al. |
| 2005/0282956 A1 | 12/2005 | Bohm et al. |
| 2005/0288393 A1 | 12/2005 | Lean et al. |
| 2006/0084722 A1 | 4/2006 | Lin et al. |
| 2006/0116473 A1 | 6/2006 | Castner et al. |
| 2006/0141150 A1 | 6/2006 | Zheng et al. |
| 2006/0147714 A1 | 7/2006 | Schultes et al. |
| 2006/0173130 A1 | 8/2006 | Wang et al. |
| 2006/0264553 A1 | 11/2006 | Karger-Kocsis |

(56) References Cited

U.S. PATENT DOCUMENTS

| | | |
|---|---|---|
| 2006/0280798 A1 | 12/2006 | Ensoli |
| 2007/0081830 A1 | 4/2007 | Bender et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0149652 A1 | 6/2007 | Yoon et al. |
| 2007/0161754 A1 | 7/2007 | Bohm et al. |
| 2007/0181302 A1 | 8/2007 | Bicerano |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0188579 A1 | 8/2008 | Wang et al. |
| 2008/0242813 A1 | 10/2008 | Zheng et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |
| 2009/0209707 A1 | 8/2009 | Okunaka et al. |
| 2009/0270558 A1 | 10/2009 | Gandon-Pain et al. |
| 2009/0306246 A1 | 12/2009 | Gervat et al. |
| 2010/0004365 A1 | 1/2010 | Saliya et al. |
| 2010/0004398 A1 | 1/2010 | Wang et al. |
| 2010/0016472 A1 | 1/2010 | Wang et al. |
| 2010/0016512 A1 | 1/2010 | Wang et al. |
| 2010/0247845 A1 | 9/2010 | Haruta et al. |
| 2010/0324167 A1 | 12/2010 | Warren et al. |
| 2011/0008607 A1 | 1/2011 | Haruta et al. |
| 2011/0021702 A1 | 1/2011 | Gandon-Pain et al. |
| 2011/0024011 A1 | 2/2011 | Castner et al. |
| 2011/0172364 A1 | 7/2011 | Yaohong et al. |
| 2011/0213066 A1 | 9/2011 | Wang et al. |
| 2011/0236686 A1 | 9/2011 | Kitano et al. |
| 2012/0108724 A1 | 5/2012 | Obrecht |
| 2012/0132346 A1 | 5/2012 | Chen et al. |
| 2015/0017446 A1 | 1/2015 | Chen et al. |
| 2015/0291719 A1 | 10/2015 | Wang et al. |
| 2016/0039964 A1 | 2/2016 | Kitano et al. |

FOREIGN PATENT DOCUMENTS

| | | |
|---|---|---|
| DE | 3735403 | 5/1989 |
| DE | 4241538 A1 | 6/1994 |
| EP | 0143500 | 6/1985 |
| EP | 0265142 A2 | 4/1988 |
| EP | 0322905 | 7/1989 |
| EP | 0352042 | 1/1990 |
| EP | 0472344 | 2/1992 |
| EP | 0590491 A2 | 4/1994 |
| EP | 0742268 | 11/1996 |
| EP | 1783168 | 5/2007 |
| JP | 70002106 B | 1/1970 |
| JP | 2191619 | 7/1990 |
| JP | 2196893 | 8/1990 |
| JP | 06093057 | 4/1994 |
| JP | 06248017 | 9/1994 |
| JP | 7011043 | 1/1995 |
| JP | 08199062 | 8/1996 |
| JP | 2000514791 | 11/2000 |
| JP | 2004018557 A | 1/2004 |
| JP | 2005537341 | 12/2005 |
| JP | 2006072283 | 3/2006 |
| JP | 2006106596 | 4/2006 |
| JP | 2007304409 | 11/2007 |
| JP | 2008069346 A | 3/2008 |
| JP | 2008239769 A | 10/2008 |
| JP | 2008274006 A | 11/2008 |
| KR | 1020080057319 | 6/2008 |
| KR | 10-1586096 A | 5/2010 |
| RU | 2184125 | 6/2002 |
| RU | 2274647 C2 | 4/2006 |
| RU | 2282637 C2 | 8/2006 |
| SU | 465010 | 3/1975 |
| WO | 9104992 | 4/1991 |
| WO | 9704029 | 2/1997 |
| WO | 0187999 A2 | 11/2000 |
| WO | 0202472 | 1/2002 |
| WO | 0231002 A1 | 4/2002 |
| WO | 0241987 | 5/2002 |
| WO | WO2002041987 | * 5/2002 |
| WO | 0244290 | 6/2002 |
| WO | 02100936 | 12/2002 |
| WO | 03032061 | 4/2003 |
| WO | 2006069793 | 7/2006 |
| WO | 2008014464 | 1/2008 |
| WO | 2008079276 | 7/2008 |
| WO | 2008079807 | 7/2008 |
| WO | 2009006434 | 1/2009 |
| WO | 03106557 A1 | 12/2013 |

OTHER PUBLICATIONS

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bradley, John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

(56) References Cited

OTHER PUBLICATIONS

Hamley, Ian W., "The Physics of Block Copolymers", Oxford Science Publication: Oxford, Chapters 3 and 4, pp. 131-265, (1998).
Ishizu, Koji et al., "Synthesis of Star Polymer with Nucleus of Microgel", Polymer Journal, vol. 12, No. 6, pp. 399-404 (1980).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, Qinggao et al., "Entirely Hydrophilic Shell Cross-Linked Knedel-Like (SCK) Nanoparticles", Polymer Preprints, vol. 41, No. 2, pp. 1571-1572 (2000).
Mayer, A.B.R. et al., "Transition metal nanoparticles protected by amphiphilic block copolymers as tailored catalyst systems", Colloid Polym. Sci., 275, pp. 333-340 (1997).
Mi, Yongli et al., "Glass transition of nano-sized single chain globules", Polymer 43, Elsevier Science Ltd., pp. 6701-6705 (2002).
Nace, Vaughn M., "Nonionic Surfactants: Polyoxyalkylene Block Copolymers", Surfactant Science Series, vol. 60, pp. 1-266 (1996).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Piirma, Irja, "Polymeric Surfactants", Surfactant Science Series, vol. 42, pp. 1-289 (1992).
Price, Colin, "Colloidal Properties of Block Copolymers", Applied Science Publishers Ltd., Chapter 2, pp. 39-80 (1982).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Riess, Gerard et al., "Block Copolymers", Encyclopedia of Polymer Science and Engineering, vol. 2, pp. 324-434 (1985).
Saito, Reiko et al., "Synthesis of Microspheres with Microphase-Separated Shells", Journal of Polymer Science: Part A: Polymer Chemistry, vol. 38, pp. 2091-2097 (2000).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Tsitsilianis, Constantinos et al., "Synthesis and characterization of hetero-arm star copolymers", Makromol. Chem. 191, pp. 2319-2328 (1990).
Tuzar, Zdenek et al., "Micelles of Block and Graft Copolymers in Solutions", Surface and Colloid Science, vol. 15, Chapter 1, pp. 1-83 (1993).
Vamvakaki, M. et al., "Synthesis of novel block and statistical methacrylate-based ionomers containing acidic, basic or betaine residues", Polymer, vol. 39, No. 11, pp. 2331-2337 (1998).
Van der Maarel, J.R.C. et al., "Salt-Induced Contraction of Polyelectrolyte Diblock Copolymer Micelles", Langmuir, vol. 16, No. 19, pp. 7510-7519 (2000).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Synthesis, Characterization, and Application of Novel Polymeric Nanoparticles", Macromolecules, 40, pp. 499-508 (2007).
Webber, Stephen E. et al., "Solvents and Self-Organization of Polymers", NATO ASI Series, Series E: Applied Sciences, vol. 327, pp. 1-509 (1996).
Wooley, Karen L., "From Dendrimers to Knedel-like Structures", Chem. Eur. J., 3, No. 9, pp. 1397-1399 (1997).
Wooley, Karen L., "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, Denis J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Mullis, Jeffrey C., Nov. 9, 2009 Office Action from U.S. Appl. No. 11/641,514 (9 pp.).
Mulcahy, Peter D., Nov. 9, 2009 Final Office Action from U.S. Appl. No. 11/642,802 (6 pp.).
Kiliman, Leszek B., Nov. 13, 2009 Office Action from U.S. Appl. No. 10/817,995 (6 pp.).
Chevalier, Alicia Ann, Nov. 25, 2009 Office Action from U.S. Appl. No. 10/886,283 (7 pp.).
Zemel, Irina Sopja, Dec. 3, 2009 Final Office Action from U.S. Appl. No. 11/305,279 (10 pp.).
Peets, Monique R., Jan. 5, 2010 Final Office Action from U.S. Appl. No. 11/697,801 (9 pp.).
Pak, Hannah J., Jan. 6, 2010 Final Office Action from U.S. Appl. No. 11/941,128 (10 pp.).
Harlan, Robert D., Dec. 28, 2009 Office Action from U.S. Appl. No. 12/504,255 (6 pp.).
Wheeler, Thurman Michael, Feb. 8, 2010 Office Action from U.S. Appl. No. 11/642,796 (13 pp.).
Powers, P.O., "Solubility of Polystyrene Fractions in Hydrocarbons", Industrial and Engineering Chemistry, vol. 42, No. 12, pp. 2558-2562 [Dec. 1950].
Peets, Monique R., Apr. 15, 2010 Notice of Allowance from U.S. Appl. No. 11/697,801 (5 pp.).
Sykes, Altrev C., Apr. 5, 2010 Final Office Action from U.S. Appl. No. 11/818,023 (24 pp.).
Pak, Hannah J., Apr. 30, 2010 Notice of Allowance from U.S. Appl. No. 11/941,128 (11 pp.).
Schacher, Felix et al., "Multicompartment Core Micelles of Triblock Terpolymers in Organic Media," Macromolecules, 42, pp. 3540-3548 (2009).
Mullis, Jeffrey C., May 26, 2010 Final Office Action from U.S. Appl. No. 11/641,514 (8 pp.).
Ducheneaux, Frank D., Jun. 8, 2010 Office Action from U.S. Appl. No. 10/817,995 (19 pp.).
Harlan, Robert D., Jun. 9, 2010 Office Action from U.S. Appl. No. 12/504,255 (6 pp.).
Chevalier, Alicia Ann, Jul. 8, 2010 Advisory Action from U.S. Appl. No. 10/886,283 (3 pp.).
Wheeler, Thurman Michael, Jul. 30, 2010 Final Office Action from U.S. Appl. No. 11/642,796 (15 pp.).
Mullis, Jeffrey C., Aug. 12, 2010 Advisory Action from U.S. Appl. No. 11/641,514 (4 pp.).
Walther, Andreas et al., "Janus Particles," Soft Matter, 4, pp. 663-668 (2008).

(56) References Cited

OTHER PUBLICATIONS

Zhao, Bin et al., "Mixed Polymer Brush-Grafted Particles: A New Class of Environmentally Responsive Nanostructured Materials," Macromolecules, 42, pp. 9369-9383 (2009).
Mensah, Laure, Sep. 20, 2010 Office Action from European Application No. 07813483.0 (4 pp.).
Egwim, Kelechi Chidi, Sep. 30, 2010 Office Action from U.S. Appl. No. 12/047,896 (6 pp.).
Egwim, Kelechi Chidi, Dec. 2, 2011 Office Action from U.S. Appl. No. 12/047,896 (5 pp.).
Sykes, Altrev C., Oct. 29, 2010 Examiner's Answer from U.S. Appl. No. 11/818,023 (25 pp.).
Chevalier, Alicia Ann, Nov. 23, 2010 Office Action from U.S. Appl. No. 10/886,283 (6 pp.).
Ducheneaux, Frank D., Dec. 28, 2010 Final Office Action from U.S. Appl. No. 10/817,995 (24 pp.).
Raider, Saira Bano, Feb. 9, 2011 Decision on Appeal from U.S. Appl. No. 11/104,759 (4 pp.).
Egwim, Kelechi Chidi, Mar. 21, 2011 Final Office Action from U.S. Appl. No. 12/047,896 (6 pp.).
Mullis, Jeffrey C., Mar. 30, 2011 Decision on Appeal from U.S. Appl. No. 10/791,049 (7 pp.).
Ducheneaux, Frank D., Apr. 4, 2011 Advisory Action from U.S. Appl. No. 10/817,995 (6 pp.).
Brovkina, T.A., English translation of May 4, 2011 Office Action from Russian Application No. 2009107218 (7 pp.).
Mullis, Jeffrey C., May 23, 2011 Office Action from U.S. Appl. No. 12/288,174 (6 pp.).
Wheeler, Thurman Michael, May 31, 2011 Office Action from U.S. Appl. No. 11/642,796 (12 pp.).
Mullis, Jeffrey C., Jun. 3, 2011 Restriction/Election Office Action from U.S. Appl. No. 12/374,883 (7 pp.).
Egwim, Kelechi Chidi, Jun. 13, 2011 Advisory Action from U.S. Appl. No. 12/047,896 (2 pp.).
Xia, Lanying, Jul. 6, 2011 Office Action with English translation from Chinese Application No. 200780047895.2 (8 pp.).
Mullis, Jeffrey C., Jul. 27, 2011 Office Action from U.S. Appl. No. 12/374,883 (13 pp.).
Brovkina, T.A., Oct. 12, 2011 Office Action with English translation from Russian Application No. 2009107218 (8 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Zemel, Irina Sopja, Apr. 30, 2012 Decision on Appeal from U.S. Appl. No. 11/305,279 (12 pp.).
Robertson, C.G. et al., "Effect of structural arrest on Poisson's ratio in nanoreinforced elastomers," Physical Review E, vol. 75, pp. 051403-1 thru 051403-7 (2007).
Walther, Andreas et al., "Engineering Nanostructured Polymer Blends with Controlled Nanoparticle Location using Janus Particles," ACS Nano., 2(6), pp. 1167-1178 (2008).
Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).
Wang, Chun Cheng, May 4, 2012 Office Action from U.S. Appl. No. 12/555,183 (9 pp.).
Wheeler, Thurman Michael, May 10, 2012 Notice of Panel Decision from Pre-Appeal Brief Review from U.S. Appl. No. 11/642,796 (3 pp.).
Newkome George R. et al., "Dendrimers and Dendrons: Concept, Synthesis, Application", Wiley-VCH Verlag GmbH, pp. 45, 191-310 (2001).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Hay, J.N. et al., "A Review of Nanocomposites," 15 pp. (2000).
Tuzar et al., "Anomalous Behaviour of Solutions of Styrene-Butadiene Block Copolymers in Some Solvents", Makromol. Chem. 178, 22743-2746 (1977).
Mandema et al., "Association of Block Copolymers in Selective Solvents, 1 Measurements on Hydrogenated Poly (styrene-isoprene) in Decane and in trans-Decalin", Makromol. Chem. 180, pp. 1521-1538 (1979).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Tomalia, Donald A. et al., "Dendritic Macromolecules: Synthesis of Starburst Dendrimers", Macromolecules vol. 19, No. 9, pp. 2466-2468 (1986).
Jensen, M. et al., "EXAFS Investigations of the Mechanism of Facilitated Ion Transfer into a Room-Temperature Ionic Liquid", J. Am. Chem. Soc., 124, pp. 10664-10665 (2002).
Canham et al., "Formation of Worm-like Micelles from a Polystyrene-Polybutadiene-Polystyrene Block Copolymer in Ethyl Acetate", J.C.S. Faraday I, 76, 1857-1867 (1980).
Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.
Greenwood, N.N. et al., Chemistry of the Elements, Pergaroen Press, New York, pp. 1126-1127 (1984).
Lagaly, Gehard, "Kink-Block and Gauche-Block Structures of Bimolecular Films", Chem. Int. Ed. Engl., vol. 15, No. 10, pp. 575-586 (1976).
Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).
Ren, Jiaxiang et al., "Linear Viscoelasticity of Disordered Polystyrene-Polyisoprene Block Copolymer Based Layered-Silicate Nanocomposites", Macromolecules, 33, pp. 3739-3746 (2000).
Moller, Martin et al., "Mineralization of Gold in Block Copolymer Micelles", Macromol. Symp., 117, pp. 207-218 (1997).
Dieterich, W. et al., "Non-Debye Relaxations in Disordered Ionic Solids", Chem. Chys., 284, pp. 439-467 (2002).
Giannelis, E.P. "Polymer Layered Silicate Nanocomposites", Advanced Materials, vol. 8, No. 1, pp. 29-35 (Jan. 1, 1996).
Tiyapiboonchaiya, Churat et al., "Polymer-m-Ionic-Liquid Electrolytes", Macromol. Chem. Phys., 203, pp. 1906-1911 (2002).
Lee, Wen-Fu et al., "Polysulfobetaines and Corresponding Cationic Polymers. IV. Synthesis and Aqueous Solution of Cationic Poly (MIQSDMAPM)", J. Appl. Pol. Sci., vol. 59, pp. 599-608 (1996).
Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).
Wiley, John, "Quaternary Ammonium Compounds", Encyclopedia of Chem Tech., 4th Ed. vol. 20, pp. 739-767 (1996).
Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).
Coleman, Jr. Lester E. et al., "Reaction of Primary Aliphatic Amines with Maleic Anhydride", J. Org,. Chem., 24, 185, pp. 135-136 (1959).
Gilman, Jeffrey W. et al., "Recent Advances in Flame Retardant Polymer Nanocomposites," Fire and Materials 2001, 7th International Conference and Exhibition. Proceedings, Interscience Communications Limited, San Antonio, TX, pp. 273-283, Jan. 22-24, 2001).
Krishnamoorti, Ramanan et al., "Rheology of End-Tethered Polymer Layered Silicate Nanocomposites", Macromolecules, 30, pp. 4097-4102 (1997).
Mossmer, Stefan et al., "Solution Behavior of Poly(styrene)-block-poly(2-vinylpyridine) Micelles Containing Gold Nanoparticles", Macromolecules, 33, pp. 4791-4798 (2000).
Haeussler, L. et al., "Simultaneous TA and MS Analysis of Alternating Styrene-Malei Anhydride and Styrene-Maleimide Copolymers", Thermochim. Acta, 277, 14 (1996).

(56) References Cited

OTHER PUBLICATIONS

Ishizu, Koji, "Star Polymers by Immobilizing Functional Block Copolymers", Star and Hyperbranched Polymers, ISBN 0-8247, pp. 135-178 (1999).
Hardacre, Christopher et al., "Structure of molten 1,3-dimethylimidazolium chloride using neutron diffraction", Journal of Chemical Physics, vol. 118, No. 1, pp. 273-278 (2003).
Coulson, S.R. et al., "Super-Repellent Composite Fluoropolymer Surfaces", The Journal of Physical Chemistry B, vol. 104, No. 37, pp. 8836-8840 (Sep. 21, 2000).
Kim, Woo-Sik et al., "Synthesis and Photocrosslinking of Maleimide-Type Polymers", Macromol. Rapid Commun., 17, 835, pp. 835-841 (1996).
Matsumoto, Akikazu et al., "Synthesis, Thermal Properties and Gas Permeability of Poly (N-n-alkylmaleimide)s", Polymer Journal, vol. 23, No. 3, pp. 201-209 (1991).
Cosgrove, Terence et al., "Adsorbed Block Copolymer of Poly(2-vinylpyridine) and Polystyrene Studied by Neutron Reflectivity and Surface Force Techniques", Macromolecules, 26, pp. 4363-4367 (1993).
Erbil, H. Yildirim et al., "Transformation of a Simple Plastic into a Superhydrophobic Surface", Science, vol. 299, pp. 1377-1380 (Feb. 28, 2003).
Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).
Vulcanization Agents and Auxiliary Materials, Rubber Compounding, Kirk-Othmer, Encyclopedia of Chemical Technology, 3rd Ed., Wiley Interscience, NY, vol. 20. pp. 390-402 (1982).
Bahadur, Pratap, "Block copolymers—Their microdomain formation (in solid state) and surfactant behaviour (in solution)", Current Science, vol. 80, No. 8, pp. 1002-1007 (Apr. 25, 2001).
Guo, Andrew et al., "Star Polymers and Nanospheres from Cross-Linkable Diblock Copolymers", Macromolecules, vol. 29, pp. 2487-2493 (Jan. 17, 1996).
Ishizu, Koji et al., "Core-Shell Type Polymer Microspheres Prepared from Block Copolymers", Journal of Polymer Science: Part C: Polymer Letters, vol. 26, pp. 281-286 (1988).
Ishizu, Koji, "Synthesis and Structural Ordering of Core-Shell Polymer Microspheres", Prog. Polym. Sci., vol. 23, pp. 1383-1408 (1998).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Oranli, Levent et al., "Hydrodynamic studies on micellar solutions of styrene-butadiene block copolymers in selective solvents", Can. J. Chem., vol. 63, pp. 2691-2696 (1985).
Pispas, S. et al., "Effect of Architecture on the Micellization Properties of Block Copolymers: A2B Miktoarm Stars vs AB Diblocks", Macromolecules, vol. 33, pp. 1741-1746 (Feb. 17, 2000).
Riess, Gerard, "Micellization of block copolymers", Progress in Polymer Science, vol. 28, pp. 1107-1170 (Jan. 16, 2003).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Wilson, D.J. et al., "Photochemical Stabilization of Block Copolymer Micelles", Eur. Polym. J., vol. 24, No. 7, pp. 617-621 (1988).
Ege, Seyhan, Organic Chemistry Structure and Reactivity, 3rd Edition, p. 959 (1994).
Haider, Saira Bano, Dec. 22, 2006 Advisory Action from U.S. Appl. No. 11/104,759 (3 pp.).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Fink, Brieann R., Sep. 30, 2015 Office Action from U.S. Appl. No. 14/746,142 (10 pp.).

Pitt Quantum Repository, "Maleimide", Retrieved at: <<http://pqr.pitt.edu/mol/peehtfaavswfbl-uhfffaoysa-n/, Retrieved Date: Sep. 24, 2015, 2 pages.
Okazaki, Tadashi,Nov. 10, 2015 Office Action with English translation from Japanese Application No. 2014-189797 (6 pp.).
Nakamura, E., May 19, 2015 Pre-appeal Examination Report with English translation from Japanese Application No. 2009-522021 (2 pp.).
Grinsted, Ronald, "Ex Parte Quayle Action for U.S. Appl. No. 13/731,666", dated Dec. 31, 2015, 5 pages.
The State Intellectual Property Office of P.R. China, "Notification of Decision to Grant Patent Right for Chinese Patent Application No. 200780036040", dated Feb. 4, 2016, 4 pages.
Kipo, Notice of Allowance from Korean Application No. 10-2011-7017864 (2 pp.).
Kaucher, Mark S., "Non-Final Office Action for U.S. Appl. No. 14/499,895", dated Mar. 10, 2016, 18 pages.
Kawaguchi, Haruma, "Functional Polymer Microspheres", In Prog. Polym. Sci., vol. 25, Elsevier Science Ltd., Jun. 30, 2000, pp. 1171-1210.
Mettler, Rolf-Martin, "Communication Pursuant to Article 94(3) EPC for European Patent Application No. 07865780.6", dated Dec. 17, 2015, 4 pages.
Grinsted, Ronald, "Notice of Allowance for U.S. Appl. No. 13/731,666", dated Mar. 14, 2016, 10 pages.
Lipman, Bernard, Mar. 25, 2004 Restriction/Election Office Action from U.S. Appl. No. 10/331,841 (6 pp.).
Lipman, Bernard, Mar. 24, 2004 Restriction/Election Office Action from U.S. Appl. No. 10/345,498 (5 pp.).
Choi, Ling Siu, Mar. 24, 2006 Office Action from U.S. Appl. No. 10/755,648 (11 pp.).
Asinovsky, Olga, Aug. 16, 2007 Advisory Action from U.S. Appl. No. 10/791,049 (2 pp.).
Asinovsky, Olga, Jul. 29, 2008 Advisory Action from U.S. Appl. No. 10/791,049 (3 pp.).
Harlan, Robert D., Jan. 9, 2008 Advisory Action from U.S. Appl. No. 10/791,177 (3 pp.).
Harlan, Robert D., Mar. 7, 2008 Advisory Action from U.S. Appl. No. 10/791,177 (3 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Kiliman, Leszak B., May 15, 2007 Advisory Action from U.S. Appl. No. 10/817,995 (2 pp.).
Mullis, Jeffrey C., Nov. 5, 2008 Advisory Action from U.S. Appl. No. 11/050,115 (4 pp.).
Sykes, Altrev C., Oct. 16, 2009 Office Action from U.S. Appl. No. 11/818,023 (20 pp.).
Haider, Saira Bano, Mar. 19, 2008 Advisory Action from U.S. Appl. No. 11/104,759 (3 pp.).
Haider, Saira Bano, Dec. 2, 2008 Office Action from U.S. Appl. No. 11/104,759 (10 pp.).
Lipman, Bernard, Sep. 14, 2006 Office Action from U.S. Appl. No. 11/168,297 (4 pp.).
Lipman, Bernard, Mar. 20, 2008 Office Action from U.S. Appl. No. 11/764,607 (4 pp.).
Russell, Graham, Nov. 4, 2008 Office Action from European Application No. 05742316.2 (2 pp.).
Schutte, M., Nov. 13, 2003 International Search Report from PCT Application No. PCT/US02/31817 (3 pp.).
Schutte, M., May 28, 2004 International Search Report from PCT Application No. PCT/US03/40375 (3 pp.).
Iraegui Retolaza, E., Jul. 9, 2004 International Search Report from PCT Application No. PCT/US2004/001000 (3 pp.).
Russell, G., Aug. 1, 2005 International Search Report from PCT Application No. PCT/US2005/010352 (3 pp.).
Harlan, Robert D., Dec. 10, 2008 Final Office Action from U.S. Appl. No. 10/791,177 (8 pp.).
Cain, Edward J., Dec. 9, 2008 Final Office Action from U.S. Appl. No. 11/642,795 (6 pp.).
Mulcahy, Peter D., Dec. 11, 2008 Restriction/Election Office Action from U.S. Appl. No. 11/642,802 (7 pp.).

(56) References Cited

OTHER PUBLICATIONS

Harlan, Robert D., Jan. 9, 2009 Office Action from U.S. Appl. No. 11/117,981 (6 pp.).
Zemel, Irina Sopja, Jan. 22, 2009 Advisory Action from U.S. Appl. No. 11/305,279 (2 pp.).
Johnson, Edward M., Dec. 12, 2008 International Search Report from PCT Application No. PCT/US2007/074611 (5 pp.).
Lipman, Bernard, Jan. 28, 2009 Notice of Allowance from U.S. Appl. No. 11/305,281 (5 pp.).
Lipman, Bernard, Jan. 27, 2009 Notice of Allowance from U.S. Appl. No. 11/764,607 (4 pp.).
Mullis, Jeffrey C., Feb. 25, 2009 Office Action from U.S. Appl. No. 11/050,115 (8 pp.).
Cain, Edward J., Feb. 23, 2009 Notice of Allowance from U.S. Appl. No. 11/642,795 (5 pp.).
Haider, Saira Bano, Mar. 3, 2009 Advisory Action from U.S. Appl. No. 11/104,759 (3 pp.).
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Kiliman, Leszek B., Mar. 19, 2009 Office Action from U.S. Appl. No. 10/817,995 (5 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Harlan, Robert D., Apr. 30, 2009 Office Action from U.S. Appl. No. 11/117,981 (7 pp.).
Mullis, Jeffrey C., Apr. 30, 2009 Final Office Action from U.S. Appl. No. 11/641,514 (11 pp.).
Mulcahy, Peter D., May 13, 2009 Office Action from U.S. Appl. No. 11/642,802 (7 pp.).
Wang, Xiaorong et al., "Dispersing hairy nanoparticles in polymer melts", Polmer, vol. 49, pp. 5683-5691 (Nov. 1, 2008) [cite in applns filed after publn date].
Peets, Monique R., May 11, 2009 Restriction/Election Office Action from U.S. Appl. No. 11/697,801 (6 pp.).
Mullis, Jeffrey C., May 19, 2009 Advisory Action from U.S. Appl. No. 10/791,049 (5 pp.).
Zemel, Irina Sopja, May 28, 2009 Office Action from U.S. Appl. No. 11/305,279 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Wheeler, Thurman Michael, Oct. 14, 2009 Restriction/Election Office Action from U.S. Appl. No. 11/642,796 (8 pp.).
Haider, Saira Bano, Sep. 11, 2009 Examiner's Answer from U.S. Appl. No. 11/104,759 (9 pp.).
Harlan, Robert D., Sep. 29, 2009 Final Office Action from U.S. Appl. No. 11/117,981 (6 pp.).
Zilliox, Jean-Georges et al., "Preparation de Macromolecules a Structure en Etoile, par Copolymerisation Anionique", J. Polymer Sci.: Part C, No. 22, pp. 145-156 (1968).
Bohm, Georg et al., "Emerging materials: technology for new tires and other rubber products", Tire Technology International, 2006 (4 pp.).
Cui, Honggang et al., "Block Copolymer Assembly via Kinetic Control", Science, vol. 317, pp. 647-650 (Aug. 3, 2007).
Edmonds, William F. et al., "Disk Micelles from Nonionic Coil—Coil Diblock Copolymers", Macromolecules, vol. 39, pp. 4526-4530 (May 28, 2006).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392—Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Heterogeneity of structural relaxation in a particle-suspension system", EPL, 79, 18001, pp. 1-5 (Jul. 2007).
Bridgestone Americas 2006 Presentation (14 pp.).
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Ferreira, Paula G. et al., "Scaling Law for Entropic Effects at Interfaces between Grafted Layers and Polymer Melts", Macromolecules, vol. 31, pp. 3994-4003 (1998).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hasegawa, Ryuichi et al., "Optimum Graft Density for Dispersing Particles in Polymer Melts", Macromolecules, vol. 29, pp. 6656-6662 (1996).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).
Matsen, M.W., "Phase Behavior of Block Copolymer/Homopolymer Blends", Macromolecules, vol. 28, pp. 5765-5773 (1995).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Noolandi, Jaan et al., "Theory of Block Copolymer Micelles in Solution", Macromolecules, vol. 16, pp. 1443-1448 (1983).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Shull, Kenneth R., "End-Adsorbed Polymer Brushes in High- and Low-Molecular-Weight Matrices", Macromolecules, vol. 29, pp. 2659-2666 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Witten, T.A. et al., "Stress Relaxation in the Lamellar Copolymer Mesophase", Macromolecules, vol. 23, pp. 824-829 (1990).

(56) References Cited

OTHER PUBLICATIONS

Worsfold, Denis J. et al, "Preparation et caracterisation de polymeres-modele a structure en etoile, par copolymerisation sequencee anionique", Canadian Journal of Chemistry, vol. 47, pp. 3379-3385 (Mar. 20, 1969).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
Saito, Reiko et al., "Core-Shell Type Polymer Microspheres Prepared From Poly(Styrene-b-Methacrylic Acid)-1. Synthesis of Microgel", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
Ma, Hongyang et al., "Reverse Atom Transfer Radical Polymerization of Methyl Methacrylate in Room-Temperature Ionic Liquids", Journal of Polymer Science: Part A: Polymer Chemistry, 41, pp. 143-151 (2003).
Kralik, M. et al., "Catalysis by metal nanoparticles supported on functional organic polymers", Journal of Molecular catalysis A: Chemical, vol. 177, pp. 113-138 [2001].
Harlan, Robert D., May 3, 2007 Office Action from U.S. Appl. No. 10/791,177 (6 pp.).
Sakurai, Ryo et al., "68.2: Color and Flexible Electronic Paper Display using QR-LPD Technology", SID 06 Digest, pp. 1922-1925 (2006).
Asinovsky, Olga, Jun. 20, 2006 Office Action from U.S. Appl. No. 10/791,049 (11 pp.).
Asinovsky, Olga, Dec. 22, 2006 Office Action from U.S. Appl. No. 10/791,049 (11 pp.).
Asinovsky, Olga, Jun. 7, 2007 Office Action from U.S. Appl. No. 10/791,049 (11 pp.).
Asinovsky, Olga, Nov. 28, 2007 Office Action from U.S. Appl. No. 10/791,049 (9 pp.).
Asinovsky, Olga, May 21, 2008 Office Action from U.S. Appl. No. 10/791,049 (11 pp.).
Asinovsky, Olga, Sep. 11, 2008 Office Action from U.S. Appl. No. 10/791,049 (12 pp.).
Ronesi, Vickey M., Jan. 8, 2007 Office Action from US. Appl. No. 10/791,177 (5 pp.).
Zhang, Jian et al., "Bioconjugated Janus Particles Prepared by in Situ Click Chemistry," Chemistry of Materials, 21, pp. 4012-4018 (2009).
Dendukuri, Dhananjay et al., "Synthesis and Self-Assembly of Amphiphilic Polymeric Microparticles," Langmuir, 23, pp. 4669-4674 (2007).
Berger, Sebastian et al., "Stimuli-Responsive Bicomponent Polymer Janus Particles by 'Grafting from'/ 'Grafting to' Approaches," Macromolecules, 41, pp. 9669-9676 (2008).
The Dow Chemical Company, "DVB Cross-link a variety of materials for improved thermal, physical, and chemical properties," 44 pp. (Jan. 2003).
Mulcahy, Peter D., Nov. 9, 2011 Office Action from U.S. Appl. No. 11/642,802 (6 pp.).
Wang, Y. et al., "Janus-Like Polymer Particles Prepared via Internal Phase Separation from Emulsified Polymer/Oil Droplets," Polymer, vol. 50, No. 14, pp. 3361-3369 (2009).
Chinese Patent Office, Nov. 3, 2011 Office Action with English translation from Chinese Application No. 200780036040.X (12 pp.).
Hofler, Thomas, May 22, 2012 Supplementary European Search Report with Search Opinion from European Application No. 09837105.7 (5 pp.).

Watanabe, Yoko, May 22, 2012 Office Action with English translation from Japanese Application No. 2008-248866 (5 pp.).
Fink, Brieann R., Jun. 6, 2012 Final Office Action from U.S. Appl. No. 12/754,367 (13 pp.).
Tsitsilianis, Constantinos, "Phase Behavior of Heteroarm Star Copolymers by Differential Scanning Calorimetry," Macromolecules, 26, pp. 2977-2980 (1993).
Malashkova, E.S., Jun. 1, 2012 Office Action with English translation from Russian Application No. 2010102943 (10 pp.).
Adams, Donald E. et al., Jun. 18, 2012 Decision on Appeal from U.S. Appl. No. 11/818,023 (13 pp.).
Wheeler, Thurman Michael, Nov. 6, 2012 Office Action from U.S. Appl. No. 11/642,796 (14 pp.).
Kaucher, Mark S., Nov. 5, 2012 Office Action from U.S. Appl. No. 12/979,732 (24 pp.).
Mullis, Jeffrey C., Feb. 9, 2011 Restriction/Election Office Action from U.S. Appl. No. 12/288,174 (8 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (8 pp.).
Kaucher, Mark S., Dec. 18, 2012 Office Action from U.S. Appl. No. 13/142,770 (19 pp.).
Wheeler, Thurman Michael, Sep. 16, 2014 Notice of Allowance from U.S. Appl. No. 11/642,796 (2 pp.).
Fink, Brieann R., Oct. 23, 2014 Office Action from U.S. Appl. No. 12/754,367 (21 pp.).
Peets, Monique R., Oct. 29, 2014 Ex Parte Quayle Office Action from U.S. Appl. No. 12/979,719 (4 pp.).
Zemel, Irina Sopja, Oct. 30, 2014 Final Office Action from U.S. Appl. No. 11/305,279 (7 pp.).
Nakamura, E., Dec. 2, 2014 Office Action with English translation from Japanese Application No. 2009-522021 (6 pp.).
Wheeler, Thurman Michael, Jul. 5, 2013 Final Office Action from U.S. Appl. No. 11/642,796 (10 pp.).
Sykes, Altrev C., Dec. 19, 2014 Final Office Action from U.S. Appl. No. 11/818,023 (14 pp.).
Korean Patent Office, Jan. 14, 2015 Office Action with English translation from Korean Application No. 10-2010-7001987 (5 pp.).
Fink, Brieann R., Feb. 13, 2015 Notice of Allowance from U.S. Appl. No. 12/754,367 (5 pp.).
Zemel, Irina Sopja, Feb. 18, 2015 Notice of Allowance from U.S. Appl. No. 11/305,279 (2 pp.).
Grinsted, Ronald, Apr. 20, 2015 Restriction Requirement from U.S. Appl. No. 13/731,666 (7 pp.).
Kaucher, Mark S., Apr. 28, 2015 Office Action from U.S. Appl. No. 14/499,895 (14 pp.).
Chinese Patent Office, May 6, 2015 Office Action from 200780036040.X (9 pp.).
Peets, Monique R., Nov. 5, 2013 Final Office Action from U.S. Appl. No. 12/979,719 (9 pp.).
Grinsted, Ronald, Jul. 15, 2015 Office Action from U.S. Appl. No. 13/731,666 (8 pp.).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Zemel, Irina Sophia, Jan. 3, 2014 Advisory Action from U.S. Appl. No. 11/305,279 (3 pp.).
Kaucher, Mark S., Jan. 31, 2014 Final Office Action from U.S. Appl. No. 13/142,770 (8 pp.).
Schwab, F.C. et al., "Anionic Dispersion Polymerization of Styrene," Advances in Polymer Synthesis, vol. 31, pp. 381-404 (1985).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).
Korean Patent Office, Feb. 27, 2014 Office Action with English translation from Korean Application No. 10-2009-7014949 (10 pp.).
Peets, Monique R., Mar. 11, 2014 Final Office Action from U.S. Appl. No. 12/979,719 (9 pp.).

(56) References Cited

OTHER PUBLICATIONS

Kotani, Marina et al., "Characterization of Carbon Filler Distribution Ratio in Polyisoprene/Polybutadiene Rubber Blends by High-Resolution Solid-State 13C NMR," Macromolecules, vol. 40, pp. 9451-9454 (2007).
Uchida, Y., Apr. 15, 2014 Office Action with English translation from Japanese Appl. No. 2010-515229 (6 pp.).
Fink, Brieann R., Apr. 23, 2014 Office Action from U.S. Appl. No. 12/754,367 (30 pp.).
Kaucher, Mark S., May 19, 2014 Notice of Allowance from U.S. Appl. No. 13/142,770 (4 pp.).
Kaucher, Mark S., Oct. 16, 2015 Final Office Action from U.S. Appl. No. 14/499,895 (17 pp.).
Okazaki, Tadashi, Aug. 18, 2015 Office Action with English translation from Japanese Application No. 2014-189797 (11 pp.)
Kipo, Jul. 30, 2015 Office Action with English translation from Korean Application No. 10-2011-7017864 (6 pp.).
Harlan, Robert D., Oct. 18, 2007 Office Action from U.S. Appl. No. 10/791,177 (6 pp.).
Harlan, Robert D., May 28, 2008 Office Action from U.S. Appl. No. 10/791,177 (8 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszek B., Sep. 5, 2008 Office Action from U.S. Appl. No. 10/817,995 (5 pp.).
Wyrozebski Lee, Katarzyna I, Dec. 19, 2006 Office Action from U.S. Appl. No. 10/872,731 (6 pp.).
Wyrozebski Lee, Katarzyna I, Mar. 7, 2007 Office Action from U.S. Appl. No. 10/872,731 (13 pp.).
Wyrozebski Lee, Katarzyna I, Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Lipman, Bernard., Sep. 29, 2006 Office Action from U.S. Appl. No. 11/058,156 (5 pp.).
Raza, Saira B., Oct. 20, 2005 Office Action from U.S. Appl. No. 11/104,759 (10 pp.).
Raza, Saira B., Aug. 21, 2006 Office Action from U.S. Appl. No. 11/104,759 (6 pp.).
Haider, Saira Bano, May 16, 2007 Office Action from U.S. Appl. No. 11/104,759 (9 pp.).
Haider, Saira Bano, Oct. 30, 2007 Office Action from U.S. Appl. No. 11/104,759 (9 pp.).
Haider, Saira Bano, Jun. 12, 2008 Office Action from U.S. Application No. 11/104,759 (10 pp.).
Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Maksymonko, John M., Feb. 20, 2008 Office Action from U.S. Appl. No. 11/305,279 (14 pp.).
Maksymonko, John M., Aug. 6, 2008 Office Action from U.S. Appl. No. 11/305,279 (11 pp.).
Maksymonko, John M., Jul. 17, 2008 Office Action from U.S. Appl. No. 11/305,281 (13 pp.).
Le, Hoa T., Sep. 25, 2008 Office Action from U.S. Appl. No. 11/612,554 (8 pp.).
Maksymonko, John M., Jun. 13, 2008 Office Action from U.S. Appl. No. 11/641,514 (7 pp.).
Mullis, Jeffrey C., Oct. 31, 2008 Office Action from U.S. Appl. No. 11/641,514 (10 pp.).
Maksymonko, John M., Jun. 11, 2008 Office Action from U.S. Appl. No. 11/642,124 (16 pp.).
Maksymonko, John M., May 30, 2008 Office Action from U.S. Appl. No. 11/642,795 (12 pp.).
Maksymonko, John M., May 28, 2008 Office Action from U.S. Appl. No. 11/642,802 (10 pp.).
Chen, Jizhuang, Dec. 30, 2005 Office Action from Chinese Application No. 02819527.2 (9 pp.).
Chen, Jizhuang, Dec. 21, 2007 Office Action from Chinese Application No. 02819527.2 (12 pp.).
Chen, Jizhuang, Sep. 26, 2008 Office Action from Chinese Application No. 02819527.2 (4 pp.).
Schutte, M., Aug. 8, 2006 Office Action from European Application No. 02807196.7 (5 pp.).
Schutte, Maya, Sep. 3, 2007 Office Action from European Application No. 02807196.7 (2 pp.).
Watanabe, Y., May 7, 2008 Office Action from Japanese Application No. 582224/2003 (5 pp.).
Watanabe, Y., Jul. 29, 2008 Office Action from Japanese Application No. 582224/2003 (17 pp.).
Iraegui Retolaza, E., May 30, 2008 International Search Report from PCT Application No. PCT/US2007/026031 (4 pp.).
Mettler, Rolf-Martin, May 27, 2008 International Search Report from PCT Application No. PCT/US2007/087869 (2 pp.).
Hammon, Andrew, Aug. 25, 2008 International Search Report from PCT Application No. PCT/US2008/068838 (4 pp.).
Kiliman, Leszek B., Feb. 13, 2003 Office Action from U.S. Appl. No. 10/038,748 (3 pp.).
Harlan, Robert D., Mar. 17, 2004 Restriction/Election Office Action from U.S. Appl. No. 10/223,393 (6 pp.).
Harlan, Robert D., Jun. 22, 2004 Office Action from U.S. Appl. No. 10/223,393 (6 pp.).
Fink, Brieann R., "Final Office Action for U.S. Appl. No. 14/746,142", dated Mar. 23, 2016, 17 pages.
Lee, "Diffusion of Polymer in Binary and Ternary Semidilute Solutions", New Trends in Physics and Physical Chemistry of Polymers, Plenum Press, New York, 1989, pp. 207-228.
Grinsted, Ronald, "Notice of Allowance for U.S. Appl. No. 13/731,666", dated Apr. 25, 2016, 9 pages.
Brazilian Patent Office, "Office Action for Brazilian Patent Application No. PI0720393-4", dated Dec. 12, 2017, 13 pages.
Brazilian Patent Office, "Office Action for Brazilian Patent Application No. PI0715207-8", dated Oct. 17, 2017, 10 pages.
Grinsted, Ronald, "Non-Final Office Action for U.S. Appl. No. 15/250,025", dated Nov. 8, 2017, 9 pages.
Dow, "DVB Cross-Link a Variety of Materials for Improved Thermal, Physical, and Chemical Properties", Feb. 10, 2003, Retrieved Date: Nov. 1, 2017, Retrieved At: «https://msdssearch.dow.com/PublishedLiteratureDOWCOM/dh_0953/0901b803809530f8.pdf?filepath=specialtymonomers/pdfs/noreg/503-00002.pdf&fromPage=GetDoc»>, 44 pages.
Peets, Monique R., "Non-Final Office Action for U.S. Appl. No. 14/822,039", dated Nov. 24, 2017, 5 pages.

\* cited by examiner

HOLLOW NANO-PARTICLES AND METHOD THEREOF

CROSS-REFERENCE TO RELATED APPLICATIONS

This application is a divisional of U.S. application Ser. No. 11/642,796, filed Dec. 20, 2006, which, in turn, claims the benefit of Provisional Application No. 60/751,830, filed Dec. 20, 2005, each of these applications are incorporated herein by reference.

BACKGROUND OF THE INVENTION

The present invention is related to a hollow nano-particle comprising a crosslinked shell and a void core; and a preparation method thereof. The hollow nano-particle may be used in rubber compositions, tire products, and pharmaceutical delivery system, among other applications.

Nano-sized particles of various shapes and sizes are very important in modern industry for they can be used as, for example, processing aids and reinforcing fillers in a variety of fields including catalysis, combinatorial chemistry, protein supports, magnets, and photonic crystals. For example, nano-particles can modify rubbers by uniformly dispersing throughout a host rubber composition as discrete particles. The physical properties of rubber such as moldability and tenacity can often be improved through such modifications. However, a simple indiscriminate addition of nano-particles to rubber is likely to cause degradation of the matrix rubber material. Rather, very careful control and selection of nano-particles having suitable architecture, size, shape, material composition, and surface chemistry, etc., are needed to improve the rubber matrix characteristics.

Advantageously, the present invention provides hollow polymer nano-particles with well-controlled architectures such as controllable void core size. The hollow nanoparticles may be widely used in rubber compositions, tire products, and pharmaceutical delivery systems.

BRIEF DESCRIPTION OF THE INVENTION

A first aspect of the invention is to provide a hollow nano-particle comprising a crosslinked shell and a void core.

A second aspect of the invention is to provide a method of preparing a hollow nano-particle comprising a crosslinked shell and a void core via micelle formation.

A third aspect of the invention is to provide a rubber composition comprising a hollow nano-particle comprising a crosslinked shell and a void core.

A fourth aspect of the invention is to provide a pharmaceutical delivery system comprising a hollow nano-particle comprising a crosslinked shell and a void core.

A fifth aspect of the invention is to provide a tire product comprising a hollow nano-particle comprising a crosslinked shell and a void core.

DETAILED DESCRIPTION OF THE INVENTION

It is to be understood herein, that if a "range" or "group" of substances or the like is mentioned with respect to a particular characteristic (e.g. temperature, size, pressure, time and the like) of the present invention, it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

Figure 1:
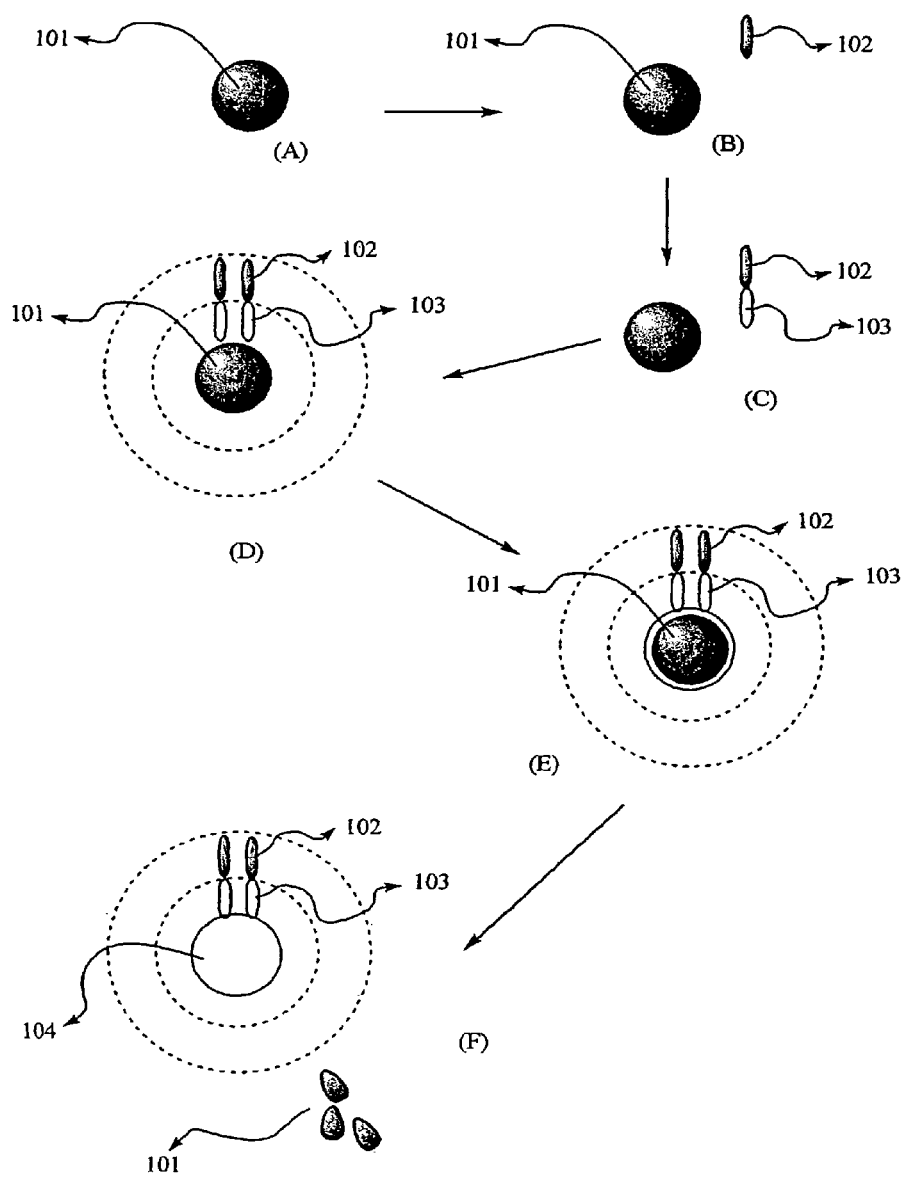
FIG. 1 is a scheme illustrating a preparation procedure of hollow nano-particles according to the present invention.

The present invention provides a hollow nano-particle comprising a crosslinked shell and a void core. With reference to FIG. 1, the hollow nano-particle may be prepared by a method which comprises:

(A) in a first solvent, providing a first polymer globule (101) which is insoluble in the first solvent;

(B) providing a second polymer (102), which is soluble in the first solvent;

(C) copolymerizing the second polymer 102 with a third polymer (103), which is insoluble in the first solvent;

(D) around the first polymer globule 101, assembling a micelle from the block copolymers which comprise the second polymer blocks 102 and the third polymer blocks 103;

(E) crosslinking the third polymer blocks 103; and (F) in a second solvent in which the first polymer is soluble, dissolving out at least a portion of the first polymer globule 101 from inside the micelle to form a hollow or void core (104).

In an embodiment of the invention, the first solvent comprises a non-aromatic hydrocarbon solvent, and the second solvent comprises an aromatic hydrocarbon solvent. The non-aromatic hydrocarbon solvent may be selected from aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These non-aromatic hydrocarbon solvents may be used individually or in combination. However, as more fully described herein below, for the purpose of micelle formation, it is preferable to select a non-aromatic hydrocarbon solvent in which the second polymer or polymer block 102 is more soluble than the third polymer or polymer block 103.

The first polymer may be any polymer which is so insoluble in the first solvent, such as the non-aromatic hydrocarbon solvent, that when generated in, or dispersed through, or mixed into, the solvent, it undergoes conformational adjustment to form a globule 101, minimizing its surface area exposed to the solvent surrounding it. In exemplary embodiments, the first polymer constitutes a colloid in the non-aromatic hydrocarbon solvent. "Colloid" is a short synonym for colloidal system, in which the term "colloidal" ordinarily refers to a state of subdivision, implying that the molecules or polymolecular particles dispersed in a medium have at least in one direction a dimension roughly between 1 nm and 1 mm, or that in a system discontinuities are found at distances of that order.

In various embodiments, polymerization of 101 and copolymerization of 102 and 103 may be conducted by any suitable polymerization mechanism such as chain reaction or stepwise reaction. By chain polymerization reaction is meant, for example, anionic reaction, free radical reaction, and cationic reaction, among others.

In a specific embodiment of the invention, anionic polymerization reaction is used to generate the first polymer globule 101, the second polymer block 102, and the third polymer block 103.

In various embodiments, the first polymer may be synthesized from a monomer of formula (I) by anionic or free radical polymerization, preferably by an anionic polymerization reaction as shown below:

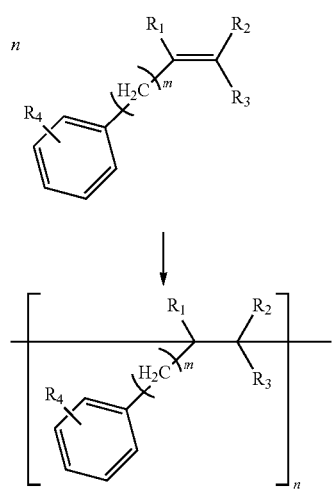

Formula (I)

in which $R_1$, $R_2$, $R_3$, and $R_4$ can be independent of each other and selected from the group consisting of hydrogen, methyl, ethyl, propyl, and isopropyl; m can be any integral number in a range of from 0 to 6; and the degree of polymerization (DP), n, for final globule 101 is in a range of from about 10 to about 100,000,000, preferably in a range of from about 10 to about 100,000.

In preferred embodiments, the non-aromatic hydrocarbon solvent is hexane; and the monomer of formula (I) comprises styrene, which corresponds to that situation wherein $R_1$, $R_2$, $R_3$, and $R_4$ are all hydrogen and m is 0 (direct bond). The degree of polymerization n directly dictates the length and molecular weight of the first polymer such as polystyrene, and therefore also indirectly determines the size of the first polymer globule 101 and the size of the hollow or void central core 104 of the final hollow nano-particles according to the present invention, which are typically in a range of from about 1 nm to about 500 nm, preferably in a range of from about 1 nm to about 100 nm. Taking polystyrene as a representative example, the value of n is preferably in the range of from about 10 to about 100,000,000, preferably from about 10 to about 100,000. So the polystyrene globule 101 and the hollow or void central core 104 will be typically in a range of from about 1 nm to about 500 nm, preferably in a range of from about 1 nm to about 100 nm.

In Step (B) of the method, the second polymer or polymer block 102 may be any polymer or polymer block which is highly soluble in the first solvent, e.g. a non-aromatic hydrocarbon solvent, to form a homogenous solution therein prior to micelle formation. In various embodiments, the second polymer or polymer block 102 may be synthesized by an anionic polymerization reaction from a conjugated 1,3-diene monomer of the formula (II) as shown below:

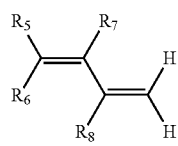

Formula (II)

in which $R_5$, $R_6$, $R_7$, and $R_8$ are each independently selected from the group consisting of hydrogen, methyl, ethyl, propyl, and isopropyl. $C_4$-$C_8$ conjugated diene monomers of formula (II) are the most preferred.

In an embodiment, specific examples of the monomers used to form the second polymer or polymer block 102 include, but are not limited to, 1,3-butadiene, Isoprene (2-methyl-1,3-butadiene), cis- and trans-piperylene (1,3-pentadiene), 2,3-dimethyl-1,3-butadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like. In preferred embodiments, 1,3-butadiene is used to form the second polymer or polymer block 102.

In Step (C) of the method, the third polymer or polymer block 103 may be any polymer or polymer block which is insoluble or less soluble than 102 in the first solvent such as non-aromatic hydrocarbon solvent, thus facilitating the micelle formation from copolymers 102-co-103. For example, without termination, the second polymer or polymer block 102 that bears an anionic living end may be further used in Step (C) to initiate the copolymerization of a monomer of Formula (III) as shown below, forming eventually the third polymer or polymer block 103 in micelle form.

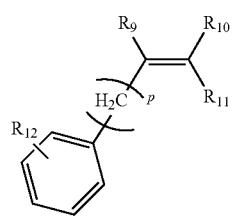

Formula (III)

in which $R_9$, $R_{10}$, $R_{11}$, and $R_{12}$ may be the same or may be independently selected from the group consisting of hydrogen, methyl, ethyl, propyl, and isopropyl; p can be any integral number in a range of from 0 to 6.

In various embodiments, the first polymer globule 101 and the third polymer or polymer block 103 may be made from the same or different monomers. In an embodiment, the formula (III) monomer is the same as formula (I) monomer such as styrene, which corresponds to that situation wherein $R_9$, $R_{10}$, $R_{11}$, and $R_{12}$ are all hydrogen, and p is 0, which means no methylene group and a direct bond is present.

In Steps (B) and (C), a bock copolymer such as diblock copolymer is formed from the second monomer of formula (II) and the third monomer of formula (III) via an anionic mechanism, although cationic, free radical, and stepwise condensation polymerizations are also contemplated. Another exemplary method of forming substantially diblock polymers is the living anionic copolymerization of a mixture of the second and the third monomers in the first solvent, such as non-aromatic hydrocarbon solvent, particularly, in the absence of certain polar additives, such as ethers, tertiary amines, or metal alkoxides which could otherwise effect the polymerization of the separately constituted polymer blocks. Under these conditions, the second monomers generally polymerize first, followed by the polymerization of the third monomers.

In Step (D) of the method, a sufficient number of the block copolymer chains, such as diblock copolymer chains, are believed to spontaneously assemble and form a micelle around the first polymer globule 101. In a specific embodiment, along the chain of the block copolymer, atomicity of its pendant groups changes in a monotonous manner from one block to another, which provides a driving force for the micelle formation. The first polymer globule 101 is more compatible with the third polymer block 103 than with the second polymer block 102 or with the first solvent, such as a non-aromatic solvent, e.g., hexane. A micelle will be formed as shown in FIG. 1, in which the first polymer globule 101 is entrapped inside the micelle, and each of the micelle copolymer chains will be so orientated that the second polymer blocks 102 point outward to the solvent phase, and the third polymer blocks 103 point inward to the first polymer globule 101.

As will be fully described though this specification, the preparation of block copolymer micelles and eventually the desired hollow nano-particles can be accomplished and optimized by careful control over selection and quantity of the second monomer, the third monomer, polymerization initiator, solvent, crosslinking agent, reaction temperature, and other components such as 1,2-microstructure controlling agent, and antioxidant. For example, pertaining to the second and third monomers as well as solvents identified herein, nano-particles are generated by maintaining a temperature that is favorable to polymerization and micelle formation, for example polymerization speed, of the selected monomers in the selected solvent(s). Preferred temperatures are in the range of about −100 to 200° C., with a temperature in the range of about −10 to 150° C. being particularly preferred.

In Step (E) of the method, the third polymer block 103 is crosslinked with a cross-linking agent. This step is important because it can integrate the micelle prepared from Step (D). In other words, it can enable the micelle to survive the solvent change in future steps thereby enhancing the uniformity and permanence of the shape and size of the resultant hollow nano-particle. In embodiments of the invention, the cross-linking agent has at least two reactive groups, for example, vinyl groups which can be polymerized, leading to a crosslinked polymer network. Preferably, a selected crosslinking agent has an affinity to the third polymer block 103 and can migrate to the inner space of the micelles due to its compatibility with the third monomer and the initiator residues present inside the micelle and its relative incompatibility with the first solvent and the second polymer block 102. Preferred crosslinking agents include, but are not limited to, di-vinyl- or tri-vinyl-substituted aromatic hydrocarbons, such as divinylbenzene (DVB).

In Step (F) of the method, the second solvent which is a solvent such as benzene, toluene, xylene, THF, $HCCl_3$, or mixtures thereof, is used to dissolve out the first polymer globule 101 from inside the micelle, thereby forming a hollow or void central core. In some embodiments of the present invention, due to the density difference between the hollow nano-particle and the first polymer globule 101, for example free polystyrene, other means such as centrifuging may be further used to enhance the separation process.

Optionally, the final hollow nano-particles may be protected by an antioxidant. Suitable antioxidants include, but are not limited to, butylated hydroxyl toluene (BHT) such as 2,6-ditertbutyl-4-methyl phenol or other stereochemically-hindered phenols, thioethers, and phosphites. The antioxidant may be added to the reaction system at anytime, and preferably after Step (F) is completed.

Prior to the crosslinking, the copolymer comprising blocks 102 and 103 may exhibit a $M_w$ of about 100 to 100,000,000, more preferably between about 1,000 and 1,000,000. A typical diblock polymer will be comprised of 1 to 99% by weight of the polymer block 102 and 99 to 1% by weight of the third polymer block 103, more preferably 5 to 95% by weight of the polymer block 102 and 95 to 5% by weight of the third polymer block 103.

Without being bound by theory, it is believed that an exemplary micelle will be comprised of about 10 to 500 block copolymers yielding, after crosslinking, a final hollow nano-particle having a $M_w$ of between about 1,000 and 10,000,000,000, preferably between about 10,000 and 500,000.

The hollow nano-particles of the present invention are substantially in a ball shape. However, depending on the environmental conditions such as absence or presence of solvent, the hollow nano-particles may deviate from the ball shape and exhibit some shape defects, for example, some surface area of the ball may collapse inward to the void core 104. Normally these shape defects are acceptable, provided the hollow nano-particles basically retain their discrete nature with little or no polymerization between particles.

The hollow nano-particles preferably are substantially monodisperse and uniform in shape. The dispersity is represented by the ratio of $M_w$ to $M_n$, with a ratio of 1 being monodisperse. The polymer hollow nano-particles of the present invention preferably have a dispersity less than about 3, more preferably less than about 2, and most preferably less than about 1.5.

Generally, the hollow nano-particles have diameters, expressed as a mean average diameter, that are preferably in a range of from about 5 nm to about 500 nm, more preferably in a range of from about 10 nm to about 200 nm, and most preferably in a range of from about 5 nm to about 80 nm.

When anionic polymerization is selected to prepare the first globule 101 and the micelle copolymer containing blocks 102 and 103, any suitable anionic initiator may be used. For example, the anionic initiator can be selected from any known organolithium compound which is known in the art as being useful in the polymerization of the monomers having formulas (I), (II), and (III). Suitable organolithium compounds are represented by the formula as shown below:

wherein $R_{13}$ is a mono- or multiple-hydrocarbyl group containing 1 to 20, preferably 2-8, carbon atoms per $R_{13}$ group, and x is an integer of 1-4. Typically, x is 1, and the $R_{13}$ group includes aliphatic radicals and cycloaliphatic radicals, such as alkyl, cycloalkyl, cycloalkylalkyl, alkylcycloalkyl, alkenyl, aryl and alkylaryl radicals.

Specific examples of $R_{13}$ groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Other lithium initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like. Preferred lithium initiators include n-butyllithium, sec-butyllithium, tert-butyllithium, 1,4-dilithiobutane, and mixtures thereof.

Other lithium initiators which can be employed are lithium dialkyl amines, lithium dialkyl phosphines, lithium alkyl aryl phosphines and lithium diaryl phosphines. Functionalized lithium initiators are also contemplated as useful in the present invention. Preferred functional groups include amines, formyl, carboxylic acids, alcohol, tin, silicon, silyl ether and mixtures thereof. A nano-particle including diblock polymers initiated with a functionalized initiator may include functional groups on the surface of the nano-particle.

The polymerization reactions used to prepare the first globule 101 and the micelle copolymers containing blocks 102 and 103 may be terminated with a terminating agent. Suitable terminating agents include, but are not limited to, alcohols such as methanol, ethanol, propanol, and isopropanol; amines, $MeSiCl_3$, $Me_2SiCl_2$, $Me_3SiCl$, $SnCl_4$, $MeSnCl_3$, $Me_2SnCl_2$, $Me_3SnCl$, and etc.

A randomizing modifier or 1,2-microstructure controlling agent may optionally be used in preparing the first globule 101 and the micelle copolymer containing blocks 102 and 103, to control the 1,2-addition mechanism of formula (II) monomers, to increase the reaction rate, and also to equalize the reactivity ratio of monomers. The modifiers used in the present invention may be linear oxolanyl oligomers represented by the structural formula (IV) and cyclic oligomers represented by the structural formula (V), as shown below:

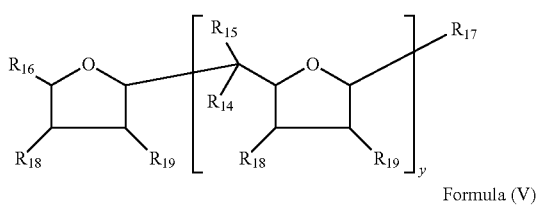

Formula (IV)

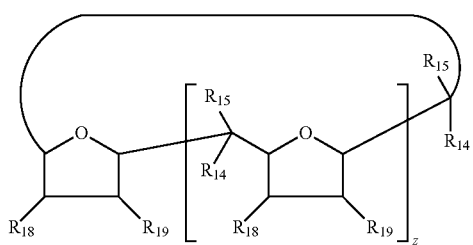

Formula (V)

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers include, but are not limited to, oligomeric oxolanyl propanes (OOPs); 2,2-bis-(4-methyl dioxane); bis(2-oxolanyl)methane; 1,1-bis(2-oxolanyl)ethane; bistetrahydrofuryl propane; 2,2-bis(2-oxolanyl) propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene (cyclic tetramer); 2,2-bis(2-oxolanyl)butane; and the like. A mixture of two or more 1,2-microstructure controlling agents also can be used. The preferred modifiers for use in the present invention are oligomeric oxolanyl propanes (OOPs).

Other suitable modifiers are hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, and tetramethylenediamine etc. A mixture of one or more randomizing modifiers also can be used.

The present invention therefore provides a hollow nano-particle, which comprises a crosslinked shell and a void core.

The diameter of the void core is in a range of from about 1 nm to less than about 500 nm, and preferably in a range of from about 1 nm to about 100 nm. In one embodiment, the outer portion of the crosslinked shell comprises polymer blocks made from a monomer of the formula (II) as described above, such as a $C_4$-$C_8$ conjugated diene, for example 1,3-butadiene. In this embodiment, the inner portion of the crosslinked shell comprises polymer blocks made from a monomer of the formula (III) as described above, such as styrene. The inner portion is crosslinked by a di-vinyl- or tri-vinyl-substituted aromatic hydrocarbon such as divinylbenzene (DVB).

The hollow nano-particle of the present invention typically has a $M_w$ of between about 1,000 and 10,000,000,000, preferably between about 10,000 and 500,000. The molecular weight ratio between the outer portion and the inner portion of the crosslinked shell is from about 1:99 to about 99:1.

The hollow nano-particle of the present invention typically has a ball shape or collapsed ball shape with a dispersity less than about 2.5, preferably less than about 1.5.

The hollow nano-particle of the present invention may be widely used in industrial applications, including but not limited to pharmaceutical delivery systems, rubber compositions, and tire products with traction improvement.

In some embodiments of the present invention, the void core of the nano-particles may be utilized as, for example, nano-holes for damping purpose, such as the foams of nano-sized bubbles. The material of nano-sized holes may also be very important for separation of gases and liquids, such as the $O_2$ separator for divers.

In some embodiments of the present invention, the void core of the nano-particles may be partially or fully "filled"

by any number of substances, such as liquids, pharmaceuticals, and process aids such as oils. The hollow nano-particles may also therefore be extensively used in medical applications such as pharmaceutical delivery systems, in polymer additions, and in inks to, for example, affect the mixing energy and filler dispersion.

Furthermore, as can be appreciated by a skilled person in the art, not only because of the physical and chemical properties of the hollow nano-particles such as size, shape, density, hydrophobic/hydrophilic balance, polarity, aromaticity, solubility and compatibility with different mediums, and morphology, but also because of various functionalities that can be introduced from functionalized anionic initiators used during the preparation of the hollow nano-particles and that can be introduced from chemical modifications based on the reactive unsaturated bonds in blocks 102 in the nano-particles, such as surface modification and functionalization with linked monomers and functional groups, and general characteristic tailoring etc., the hollow nano-particles of the present invention advantageously may have great potential in improving their performance in rubbers, tires, thermoplastics, and other industrial applications.

For example, the second polymer blocks 102 that are made from conjugate dienes may be further crosslinked to form a solid hard shell, depending on the crosslinking density. It also may be hydrogenated to form a modified surface layer. A hydrogenation step may be carried out by methods known in the art for hydrogenating polymers, particularly polydienes. A preferred hydrogenation method includes placing the hollow nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range, preferably between about 10 and 3000 kPa, more preferably between about 50 and 2600 kPa. $H_2$ may be charged continuously or in individual charges until the desired conversion is achieved. Preferably, the hydrogenation reaction will reach at least about 40% conversion, more preferably greater than about 85% conversion.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The surface layer formed by a hydrogenation step will vary depending on the identity of the monomer of formula (II) utilized in the formation of the nano-particle surface layer. For example, after hydrogenation, a 1,3-butadiene polymer layer will become a crystalline poly(ethylene) layer. In other embodiments, a surface layer of the hollow nano-particle may include both ethylene and propylene units after hydrogenation, if a conjugated diene such as isoprene monomer has been used as the monomer of formula (II).

A variety of applications are contemplated for use in conjunction with the hollow nano-particles of the present invention. Furthermore, modification of the hollow nano-particles renders them suitable for many other different applications. All forms of the present inventive hollow nano-particles are, of course, contemplated for use in each of the exemplary applications and all other applications envisioned by the skilled artisan.

After the polymer hollow nano-particles have been formed, they may be blended with a rubber to improve the physical characteristics of the rubber composition. Hollow nano-particles are useful modifying agents for rubbers because they are discrete particles which are capable of dispersing uniformly throughout the rubber composition, resulting in uniformity of physical characteristics. Furthermore, certain of the present polymer hollow nano-particles are advantageous because, for example, the outer poly (conjugated diene) blocks 102 are capable of bonding with rubber matrix due to the accessibility of their double bonds.

The present polymer hollow nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the present hollow nano-particles may be used to improve rubber tensile and tear strength etc. to a great degree.

Furthermore, hollow nano-particles with hydrogenated surface layers may demonstrate improved compatibility with specific rubbers. For example, hollow nano-particles including a hydrogenated polyisoprene surface layer may have superior bonding with and improved dispersion in an EPDM rubber matrix due to the compatibility of hydrogenated isoprene with EPDM rubber.

Additionally, the hollow nano-particles may demonstrate improved compatibility with rubbers. The tail-like copolymer comprising blocks 102 may form a brush-like surface. The host rubber composition is then able to diffuse between the tails allowing improved interaction between the host and the hollow nano-particles.

Hydrogenated hollow nano-particles prepared in accordance with the present invention may also find applications in hard disk technology. The hydrogenated hollow nano-particles, when compounded with a polyalkylene and a rubber, will demonstrate a tensile strength comparable to that necessary in hard disk drive compositions.

Hollow nano-particles prepared in accord with the present invention, whether hydrogenated or non-hydrogenated may also be blended with a variety of thermoplastic elastomers, such as SEPS, SEBS, EEBS, EEPE, polypropylene, polyethylene, and polystyrene. For example, hollow nano-particles with hydrogenated isoprene surface layers may be blended with a SEPS thermoplastic to improve tensile strength and thermostability.

Surface functionalized hollow nano-particles prepared in accordance with the present invention, whether hydrogenated or non-hydrogenated, may also be compounded with silica containing rubber compositions. Including surface functionalized hollow nano-particles in silica containing rubber compositions may potentially decrease the shrinkage rates of such silica containing rubber compositions.

The hollow nano-particle of the present invention can also be used to modify rubber in situations requiring superior damping properties, such as engine mounts and hoses (e.g. air conditioning hoses). Rubber compounds of high mechanical strength, super damping properties, and strong resistance to creep are demanded in engine mount manufacturers. Utilizing the nano-particles within selected rubber formulations can improve the characteristics of the rubber compounds.

Similarly, the hollow nano-particles can be added into typical plastic materials, including polyethylene, polypropylene, polystyrene, to for example, enhance impact strength, tensile strength and damping properties. Of course, the present inventive hollow nano-particles are also suited to other presently existing applications for nano-particles, including the medical field, e.g. drug delivery and blood applications, ER fluids, information technology, e.g. quantum computers and dots, aeronautical and space research, environment and energy, e.g., oil refining, and lubricants.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

For all below described material preparations, styrene in hexane (32.8 weight percent styrene), butadiene in hexane (21.0 weight percent butadiene), hexane, butyl lithium (1.54 M), OOPS (1.6M), isopropanol and BHT were used as supplied.

Example 1

To a 32 oz. nitrogen purged bottle, 100 g of pure hexane, 77 g of styrene/hexane blend (32.8 wt % styrene), 0.2 ml of OOPS, and 1.0 ml of 1.54M butyl lithium were added. Then, the bottle was agitated in a water bath of 80° C. for 20 minutes. The resulting solution appeared to be red. After that, the bottle was charged with 0.1 ml nitrogen purged isopropanol to terminate the reaction. Since polystyrene is not soluble in hexane, the bottle was again placed in a 80° C. water bath in order to complete the termination. The resultant solution was milky. Then, 72 g of 1,4-butadiene/hexane blend (21.0 wt %) was added into the bottle. The reaction was reinitialized by adding 1 ml of 1.54M butyl lithium to the bottle. The solution turned a light yellow. After a 20-minute reaction, 55 g styrene/hexane blend (32.8 wt % styrene) was charged into the bottle. The solution turned a red color. After additional 20-minute reaction period, the bottle was allowed to cool down to 40° C. and then 8 ml DVB was added into the bottle. The solution immediately turned deep red. Finally, after about 1 hour reaction, the solution was terminated by charging the bottle with 1 ml isopropanol. About 0.2 g BHT was added into the solution, and the product was obtained after evaporating the solvent.

Example 2

The procedure used in Example 1 was used except for some changes of materials charged. To a 32 oz. nitrogen purged bottle, 100 g of pure hexane, 84.2 g of styrene/hexane blend (32.8 wt % styrene), 0.1 ml of OOPS, and 0.5 ml of 1.54M butyl lithium were added. Then, the bottle was agitated in a water bath of 80° C. for 20 minutes. After that, the bottle was charged with 0.05 ml nitrogen purged isopropanol. The polystyrene was completely phased out from the solvent. Then, 71 g of 1,4-butadiene/hexane blend (21.0 wt %) were added into the bottle. The reaction was reinitialized with adding to the bottle 1 ml of 1.54M butyl lithium. After 20-minute reaction, 15 ml styrene/hexane blend (32.8 wt % styrene) was charged into the bottle. After additional 20-minute reaction, the solution appeared milk-like, the bottle was allowed to cool down to 40° C. and then 17 ml DVB was added into the bottle. The reaction was finally terminated with isopropanol and the material protected with adding 0.2 g BHT.

Example 3

The procedure used in Example 2 was used here except for some changes of materials charged. To a 32 oz. nitrogen purged bottle, 95 g of pure hexane, 87 g of styrene/hexane blend (32.8 wt % styrene), 0.2 ml of OOPS, and 1.0 ml of 1.54M butyl lithium were added. Then, the bottle was agitated in a water bath of 80° C. for 1 hour. After that, the bottle was charged with 0.1 ml nitrogen purged isopropanol. The bottle was agitated in the 80° C. water bath for another 2 hours. Then, 74 g of 1,4-butadiene/hexane blend (21.0 wt %) were added into the bottle. The reaction was re-initialized with adding the bottle 1 ml of 1.54M butyl lithium. After 30-minute reaction, 15 ml styrene/hexane blend (32.8 wt % styrene) was charged into the bottle. After an additional 30-minute reaction, the solution appeared milk-like, the bottle was allowed to cool down to 40° C., and then 25 ml DVB was added into the bottle. The reaction took place for 2 hours and finally terminated with isopropanol. The material protected with adding 0.1 g BHT (butylated hydroxytoluene). After evaporation of the solvent, a white powder-like material was obtained.

Example 4

Figure 2:
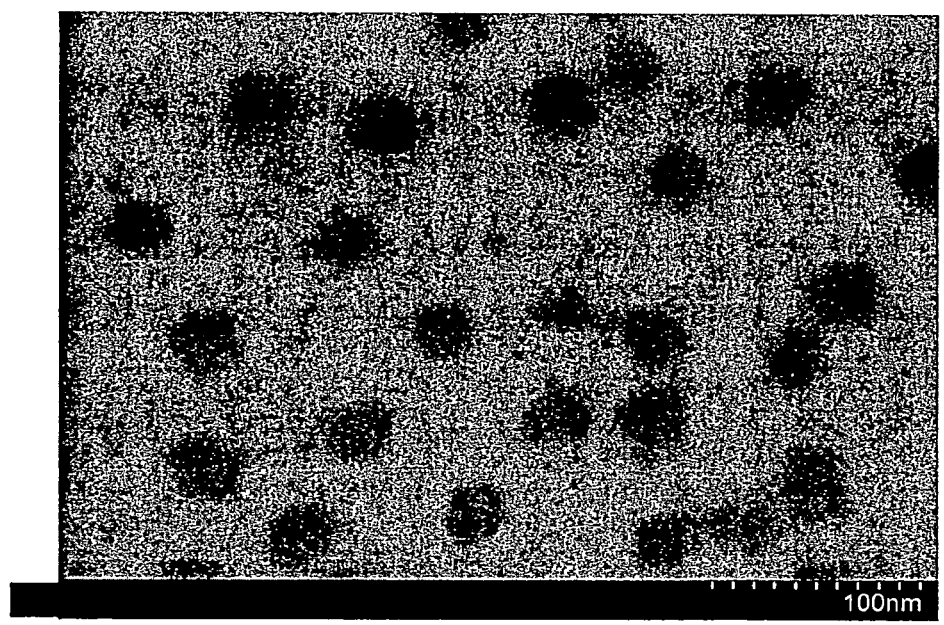
FIG. 2 shows the 100 nm-scale transmission electron microscopy (TEM) image of not-yet-hollow nano-particles according to an embodiment of the invention.
Figure 3:
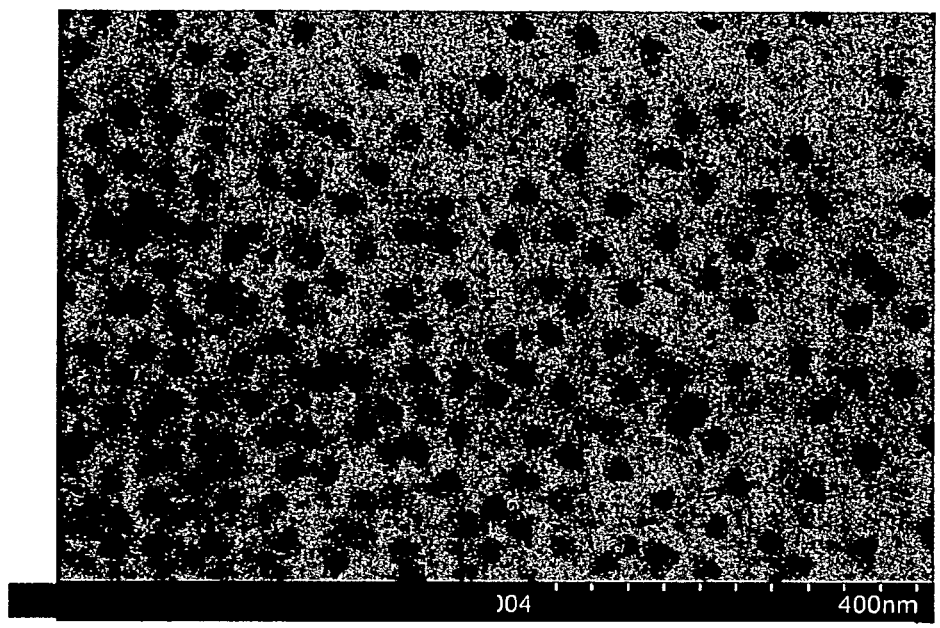
FIG. 3 shows the 400 nm-scale TEM image of not-yet-hollow nano-particles according to an embodiment of the invention.

The nano-sized dense-core particles obtained from Example 3 was examined by transmission electron microscopy (TEM). FIGS. 2 and 3 show the 100 nm-scale and 400 nm-scale TEM images of the not-yet-hollow nano-particles before toluene extraction, which as will be seen is very different from that of the final hollow nano-particles.

Example 5

Figure 4:
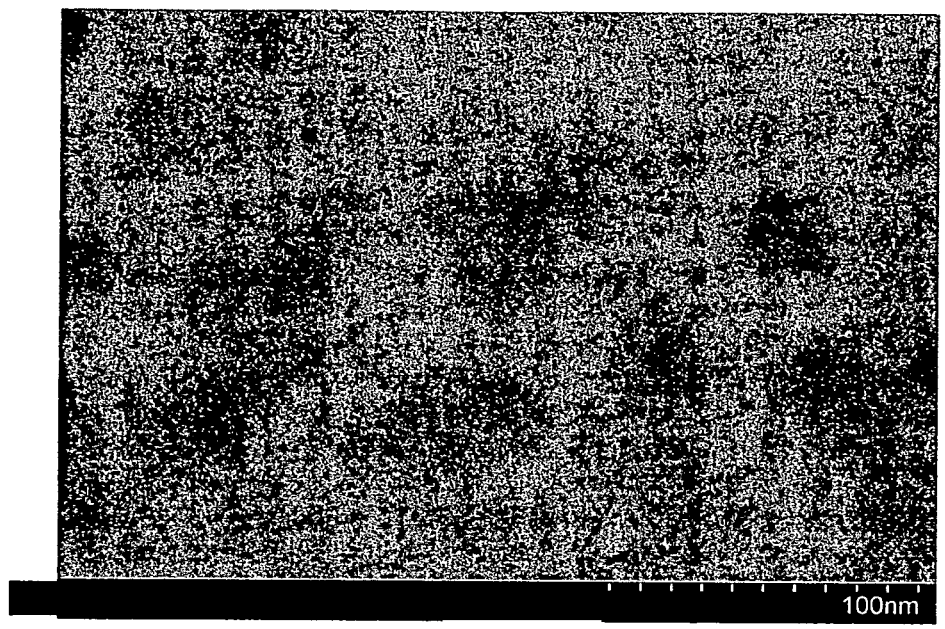
FIG. 4 shows the 100 nm-scale TEM image of hollow nano-particles according to an embodiment of the invention.
Figure 5:
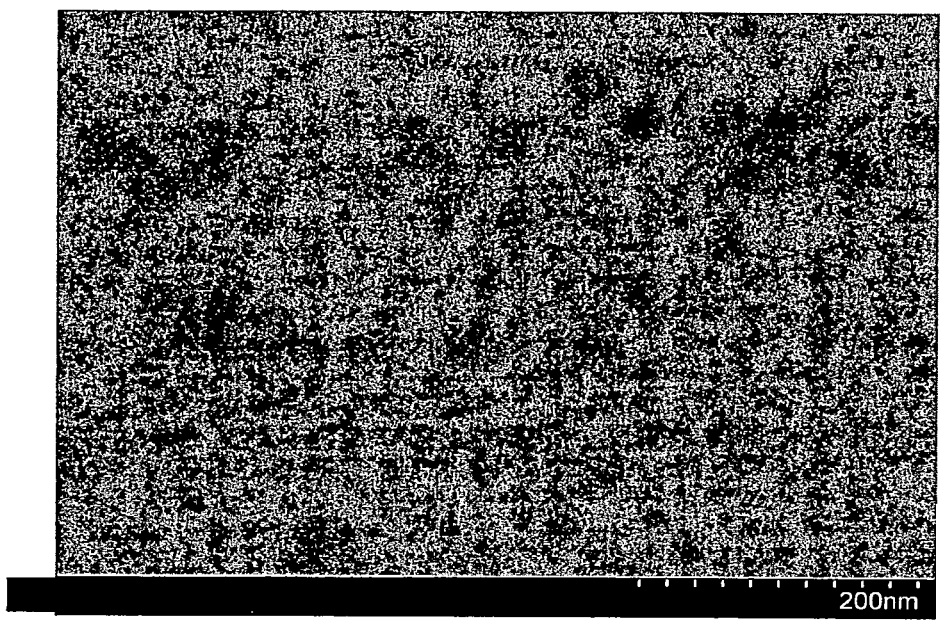
FIG. 5 shows the 200 nm-scale TEM) image of hollow nano-particles according to an embodiment of the invention.

0.5 g of the material from Example 3 was dissolved into 40 ml toluene to make a toluene solution. Hexane was then used to precipitate the polystyrene, because the hollowed particles can be well dispersed in hexane solution. Using centrifuging, the hollowed particle was separated with the free polystyrene. Finally, the hexane solution was further diluted to about 10-5 wt %. A small drop of the final solution was placed on a copper micro-grid. After the solvent evaporated, the surface was then examined under transmission electron microscopy (TEM). FIGS. 4 and 5 show the 100 nm-scale and 200 nm-scale TEM images respectively. The particles appeared as nano-sized donuts indicating the particles were hollowed. The donut-like appearance was well known for hollow particles, for example, red blood cells appearance under optical microscopy. The donut appearance came from collapse of a hollow ball on a flat surface.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

It is claimed:

1. A method of preparing hollow nano-particles, which comprises
    (A) in a first solvent, providing a first polymer globule which is insoluble in the first solvent;
    (B) adding to the first solvent a second polymer, or adding the monomers corresponding to the second polymer and synthesizing the second polymer, the second polymer being soluble in the first solvent, and adding a third polymer, or adding the monomers corresponding to the third polymer and synthesizing the third polymer, the third polymer being insoluble in the first solvent;

(C) copolymerizing the second polymer with the third polymer to form block copolymers with a soluble second polymer block and an insoluble third polymer block;

(D) around the first polymer globule, assembling a micelle from the block copolymers which comprise the soluble second polymer blocks and the insoluble third polymer blocks;

(E) crosslinking the insoluble third polymer blocks; and (F) in a second solvent in which the first polymer globule is soluble, dissolving out at least a portion of the first polymer globule from inside the micelle to form a void core;

wherein the first solvent comprises a non-aromatic hydrocarbon solvent selected from the group consisting of aliphatic hydrocarbon, alicyclic hydrocarbon, and mixture thereof;

wherein the diameter of the first polymer globule or the diameter of the void core is in a range of from about 1 nm to about 500 nm;

wherein the second polymer is polymerized from monomer of formula (II) as shown below:

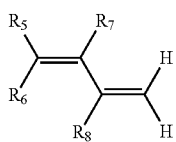

Formula (II)

in which $R_5$, $R_6$, $R_7$, and $R_8$ are each independently selected from the group consisting of hydrogen, methyl, ethyl, propyl, and isopropyl.

2. The method according to claim 1, in which the providing a first polymer globule is realized by anionically polymerizing monomer of formula (I) as shown below:

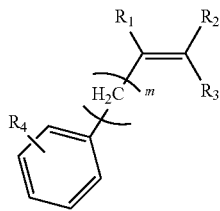

Formula (I)

wherein $R_1$, $R_2$, $R_3$, and $R_4$ are independent of each other and selected from the group consisting of hydrogen, methyl, ethyl, propyl, and isopropyl; and m is an integral number in the range of from 0 to 6.

3. The method according to claim 2, in which the monomer of formula (I) comprises styrene.

4. The method according to claim 1, in which the second polymer of step (B) comprises poly(1,3-butadiene).

5. The method according to claim 1, in which the third polymer of step (C) comprises an anionically polymerized monomer of formula (III) as shown below:

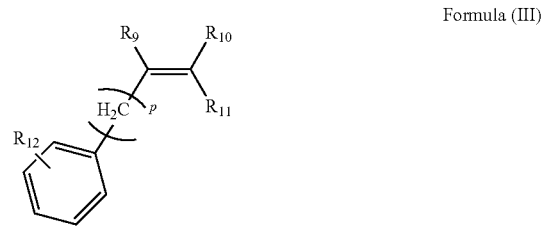

Formula (III)

in which $R_9$, $R_{10}$, $R_{11}$, and $R_{12}$ are independent of each other and selected from the group consisting of hydrogen, methyl, ethyl, propyl, and isopropyl; and p is an integral number in a range of from 0 to 6.

6. The method according to claim 5, in which the monomer of formula (III) comprises styrene.

7. The method according to claim 1, in which the crosslinking in Step (E) is carried out by using a di-vinyl- or tri-vinyl-substituted aromatic hydrocarbon.

8. The method according to claim 7, in which the aromatic hydrocarbon comprises divinylbenzene (DVB).

9. The method according to claim 1, in which the second solvent in Step (F) is selected from the group consisting of benzene, toluene, xylene, THF, $HCCl_3$, and mixture thereof.

10. The method according to claim 1, which optionally comprises a further step of separating the first polymer and the hollow nano-particle by centrifuging, precipitation, and/or phase separation.

11. The method according to claim 1, in which the block copolymer formed in Steps (B) and (C) has a Mw of about 100 to 100,000,000.

12. The method according to claim 1, in which the final hollow nano-particle has a Mw of between about 1,000 and 10,000,000,000.

13. The method according to claim 1, in which the final hollow nano-particle has a dispersity less than about 2.5.

14. The method according to claim 1, in which an anionic initiator is used in Steps (A), (B) and/or (C).

15. The method according to claim 14, in which the anionic initiator is functionalized with amine, formyl, carboxylic acids, alcohol, tin, silicon, silyl ether, or mixture thereof.

16. The method according to claim 1, further including a step of hydrogenation of the shell of the hollow nano-particle.

17. The method according to claim 1, further including a step of crosslinking of the shell of the hollow nano-particle.

* * * * *